(12) United States Patent
Weisman et al.

(10) Patent No.: US 9,953,048 B2
(45) Date of Patent: Apr. 24, 2018

(54) DETERMINATION OF PROMINENT PHRASES IN MULTI-CHANNEL INTERACTIONS BY MULTI-FEATURE EVALUATIONS

(71) Applicant: NICE-SYSTEMS LTD, Ra'anana (IL)

(72) Inventors: Hila Weisman, Tel Aviv (IL); Peter Izsak, Nesher (IL); Victor Shafran, Ramat Gan (IL)

(73) Assignee: NICE LTD., Ra'anana (IL)

( * ) Notice: Subject to any disclaimer, the term of this patent is extended or adjusted under 35 U.S.C. 154(b) by 509 days.

(21) Appl. No.: 14/639,152

(22) Filed: Mar. 5, 2015

(65) Prior Publication Data
US 2016/0048546 A1 Feb. 18, 2016

Related U.S. Application Data

(60) Provisional application No. 62/037,120, filed on Aug. 14, 2014.

(51) Int. Cl.
| | | |
|---|---|---|
| G06F 17/00 | (2006.01) | |
| G06F 17/30 | (2006.01) | |
| G06F 17/27 | (2006.01) | |
| G10L 15/02 | (2006.01) | |

(52) U.S. Cl.
CPC .... *G06F 17/30345* (2013.01); *G06F 17/2765* (2013.01); *G06F 17/2785* (2013.01); *G06F 17/3056* (2013.01); *G06F 17/30876* (2013.01); *G10L 15/02* (2013.01)

(58) Field of Classification Search
CPC ............ G06F 17/2765; G06F 17/2785; G06F 17/30345; G06F 17/3056; G06F 17/30876
See application file for complete search history.

(56) References Cited

U.S. PATENT DOCUMENTS

| | | | |
|---|---|---|---|
| 2011/0213655 A1* | 9/2011 | Henkin | G06Q 30/00 705/14.49 |
| 2012/0209605 A1 | 8/2012 | Hurvitz et al. | |

* cited by examiner

*Primary Examiner* — Truong Vo
(74) *Attorney, Agent, or Firm* — Soroker Agmon Nordman

(57) ABSTRACT

A method for determining prominent keyphrases in interactions, comprising, receiving keyphrases of numerous interactions received via a plurality of channels that comprise apparatuses for conveying the interactions according to the media thereof, quantitatively evaluating each keyphrase by a plurality of different metrics thereby yielding a corresponding plurality of values, and linearly combining the plurality of the values with a corresponding plurality of coefficients associated with a channel via which an interaction having said keyphrase is received, thereby providing a score of said keyphrase, and based on a condition related to the scores of the keyphrases, selecting at least one keyphrase as an at least one prominent keyphrase, wherein the method is at least partially performed by an at least one computerized apparatus configured for interfacing with the apparatuses of the plurality of the channels.

15 Claims, 5 Drawing Sheets

DETERMINATION OF PROMINENT PHRASES IN MULTI-CHANNEL INTERACTIONS BY MULTI-FEATURE EVALUATIONS

RELATED APPLICATIONS

The present application claims priority of a U.S. Provisional Application Ser. No. 62/037,120 filed on Aug. 14, 2014.

BACKGROUND

The present disclosure generally relates to interaction analysis, and more specifically to determination of prominent terms in interactions.

Some attempted solutions have tried to analyze data from multi-channel interactions.

For example, Clarabridge Engage (Clarabridge, Reston, Va., USA, http://www.clarabridge.com) that provides a solution to support multi-channel engagement, allowing for a more holistic engagement program.

Another example is Nexidia Interaction Analytics (Nexidia Inc., Atlanta, Ga., USA, http://www.nexidia.com) that provides a solution which structures, synthesizes and analyzes multi-channel contact center interactions.

SUMMARY

One exemplary embodiment of the disclosed subject matter is a method for determining prominent keyphrases in interactions, comprising, receiving keyphrases of numerous interactions received via a plurality of channels that comprise apparatuses for conveying the interactions according to the media thereof, quantitatively and automatically evaluating each keyphrase by a plurality of different metrics thereby yielding a corresponding plurality of values, and linearly combining the plurality of the values with a corresponding plurality of coefficients associated with the channel via which the interaction having said keyphrase was received, thereby providing a score of said keyphrase, and based on a condition related to the scores of the keyphrases, selecting at least one keyphrase as an at least one prominent keyphrase, wherein the method is at least partially performed by an at least one computerized apparatus configured for interfacing with the apparatuses of the plurality of the channels.

Another exemplary embodiment of the disclosed subject matter is an apparatus for carrying out the method.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1:
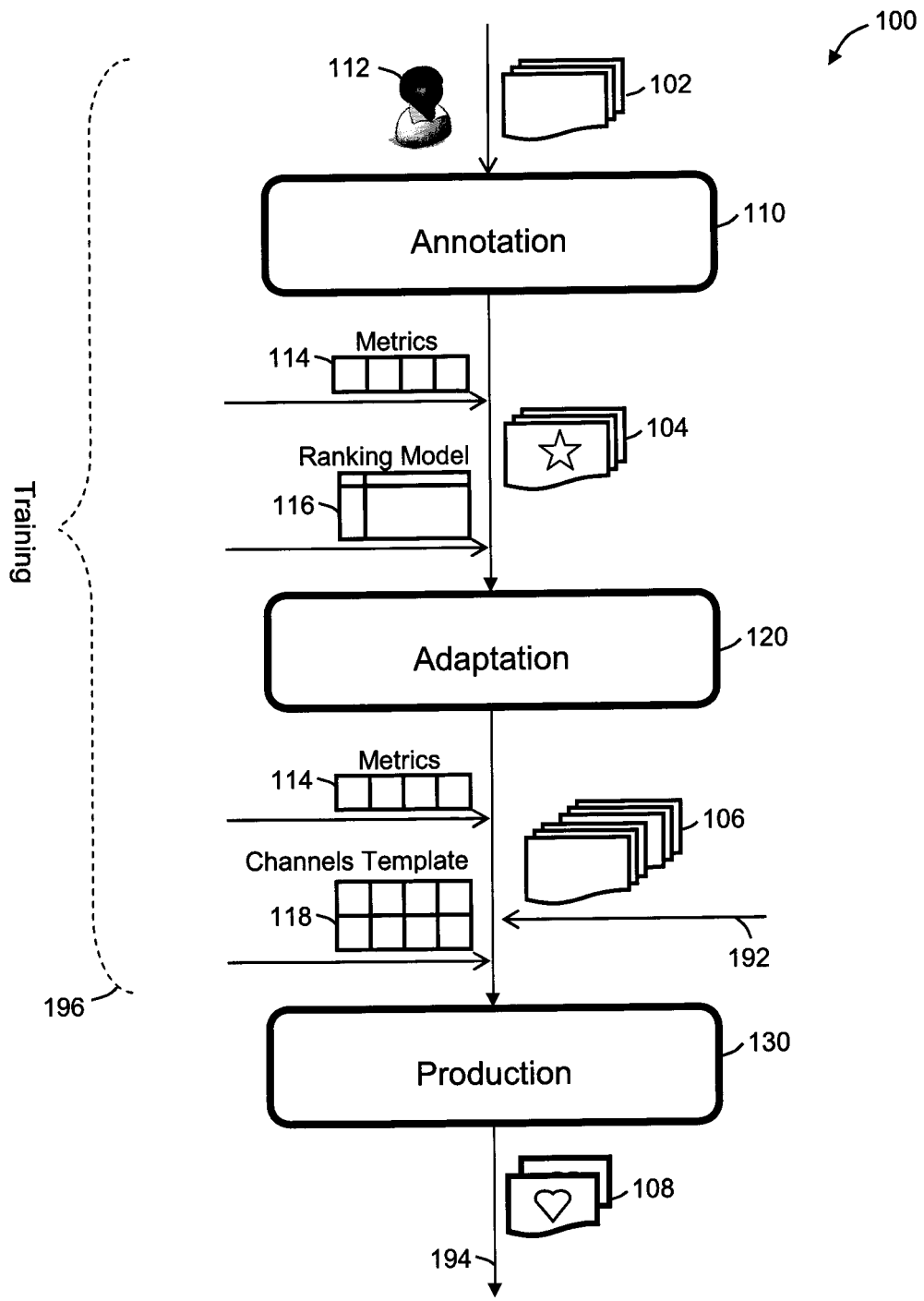

References to previously presented elements are implied without necessarily further citing the drawing or description in which they appear.

Figure 2:
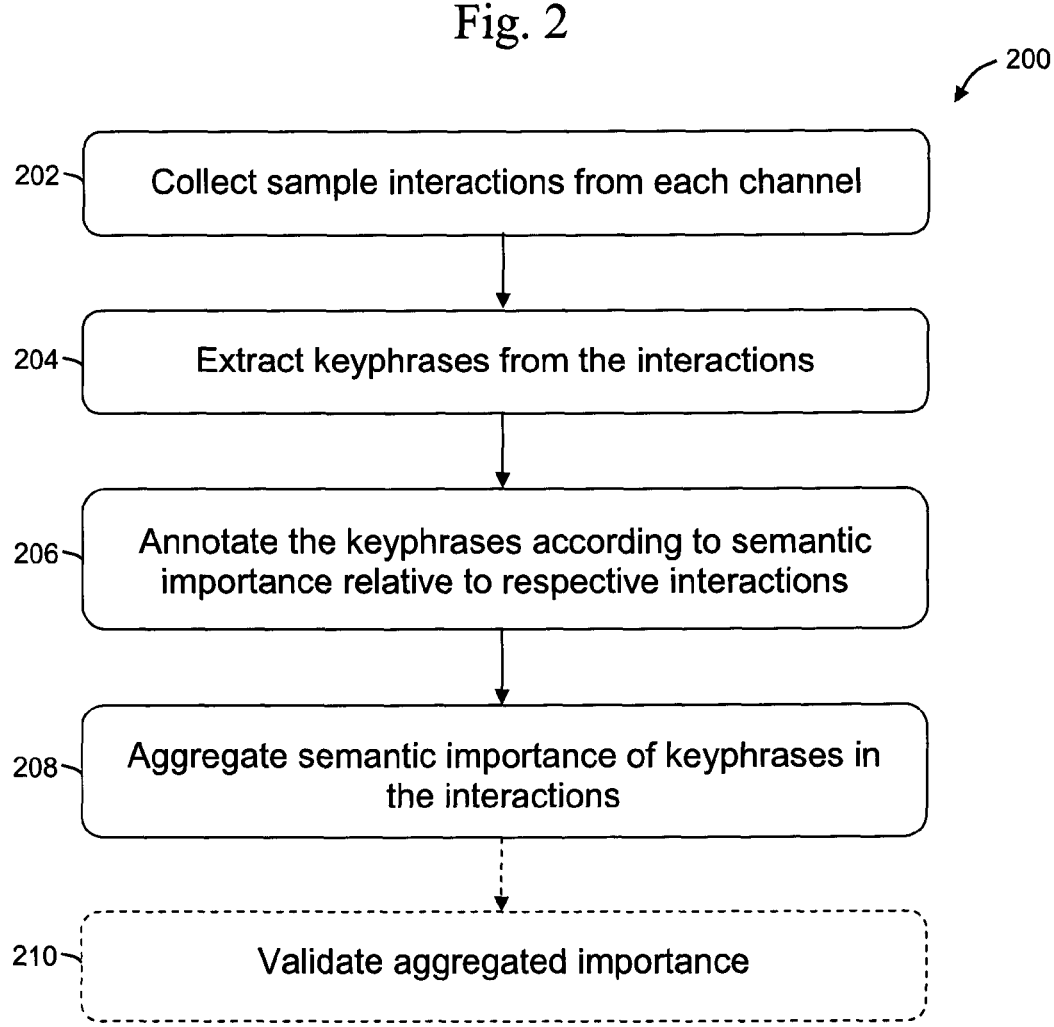
Figure 3:
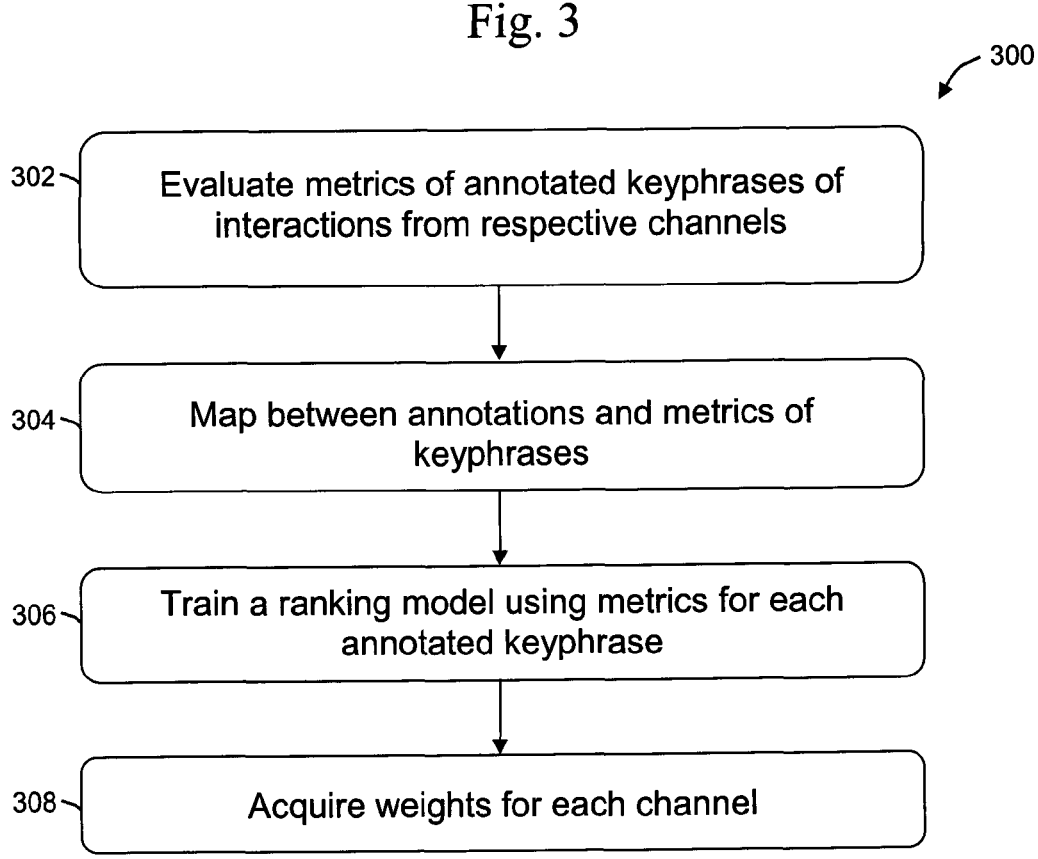
Figure 4:
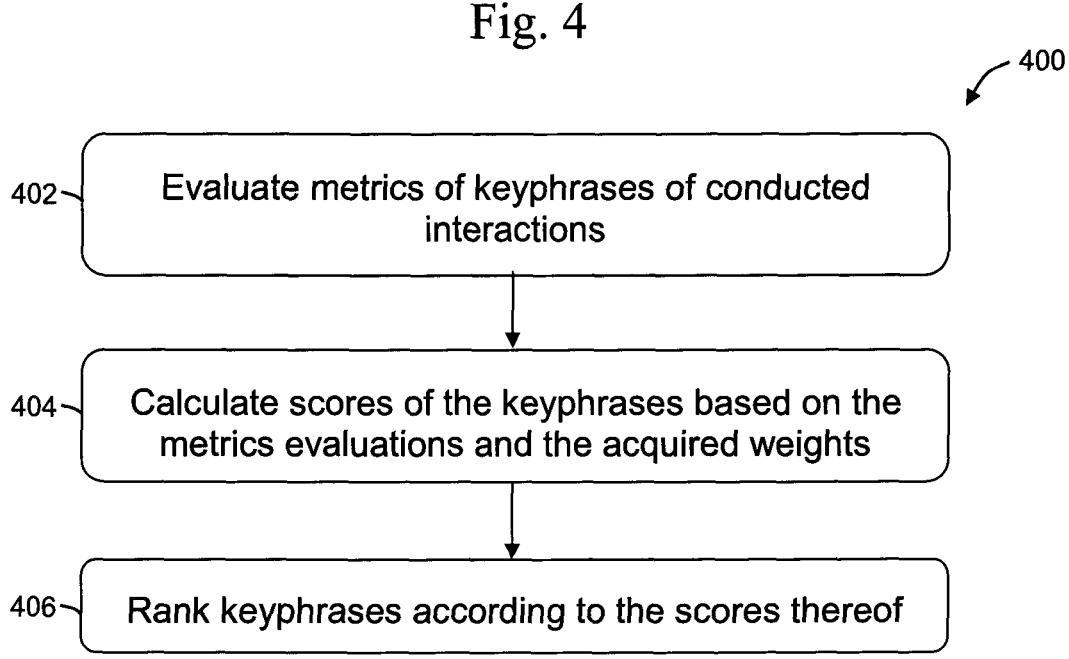
Figure 5:
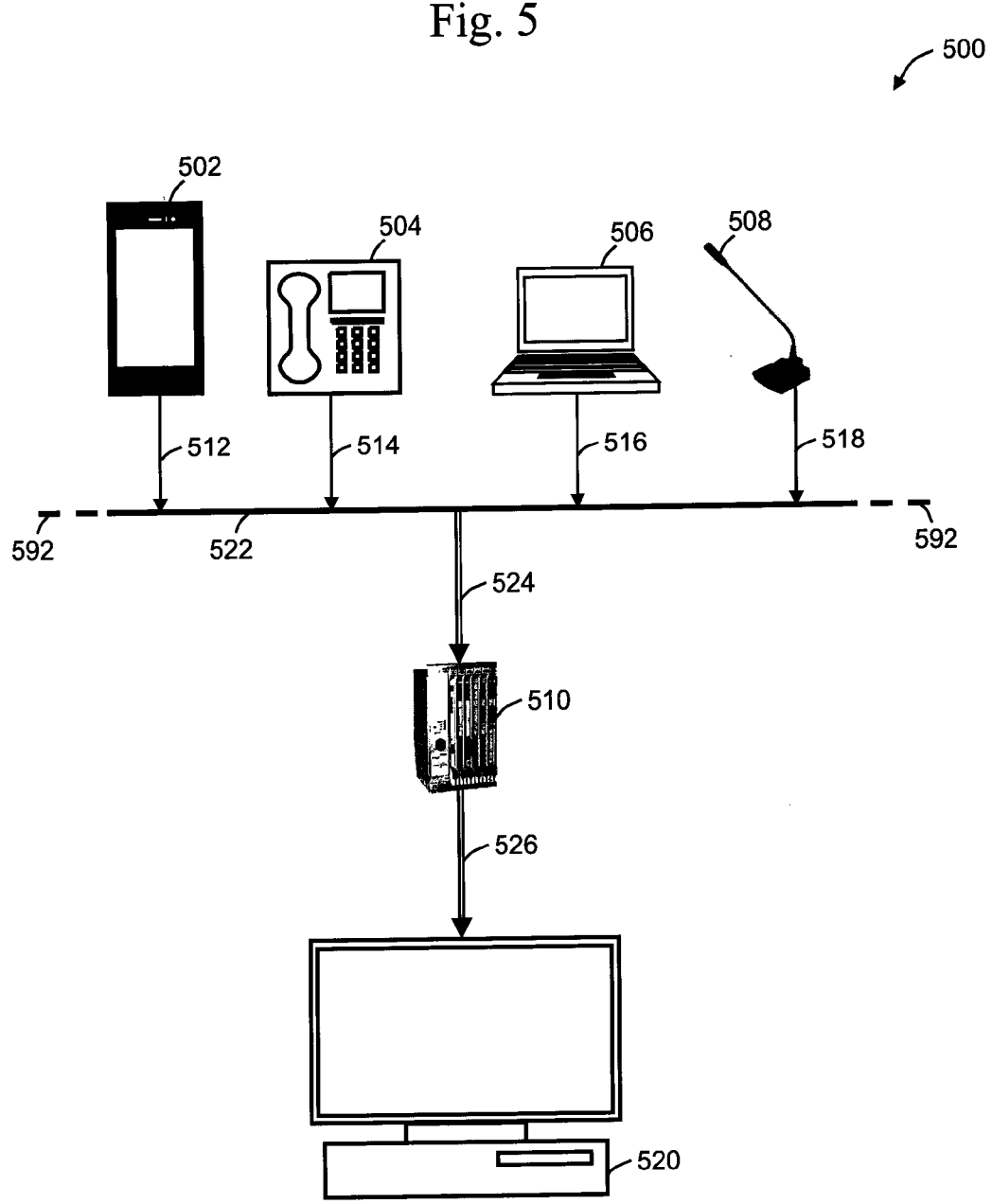

FIG. 1 schematically illustrates an arrangement of elements and phases in determination of prominent keyphrases of interactions, according to exemplary embodiments of the disclosed subject matter;

FIG. 2 outlines some elaborations of the annotation phase of FIG. 1, according to exemplary embodiments of the disclosed subject matter;

FIG. 3 outlines some elaborations of the adaptation phase of FIG. 1, according to exemplary embodiments of the disclosed subject matter;

FIG. 4 outlines some elaborations of the production phase of FIG. 1, according to exemplary embodiments of the disclosed subject matter; and FIG. 5 schematically illustrates exemplary devices and apparatus for interactions channels, according to exemplary embodiments of the disclosed subject matter.

DETAILED DESCRIPTION

In the context of the present disclosure, without limiting, the term 'keyphrase' implies a sequence of few words, not precluding a single word, conveying some coherent or comprehensible information or concept. Generally, without limiting, a keyphrase includes between 1 and 3 words, excluding irrelevant words such as selected or determined stop-words.

For example, in a sentence 'Sheila was very helpful', the excerpts 'very helpful' and 'helpful' are considered as keyphrases since they denote the respective attributes of an entity; on the other hand, the excerpt 'Sheila was' is not considered a keyphrase since without an object one cannot plainly comprehend anything about Sheila.

In the context of the present disclosure, without limiting, the term 'interaction' implies communication from one party to another party and/or between a plurality of parties, where the communication contents comprises text and/or speech textual transcripts.

In the context of the present disclosure, without limiting, the term 'channel' implies a resource and/or means through or by which an interaction is conducted. For example, a telephone, a microphone, an email, SMS or others such as IM (Immediate Messaging).

In the context of the present disclosure, referring to numerous interactions or multitude of interactions implies abundant or excessive number of interactions, usually beyond the capacity of manual follow up or grasping. Generally, without limiting, the number of interactions is in the order of magnitude of $10^2$ or higher such as $10^3$.

In the context of the present disclosure, without limiting, a 'prominent keyphrase' implies a keyphrase having evaluation and/or significance and/or prevalence higher than other keyphrases occurring in numerous interactions. Thus, at least potentially, the keyphrase or keyphrases represent or portray the topics or subject matter of the numerous interactions.

In the context of the present disclosure, without limiting, the term 'metric' denotes a certain quantitative measure and/or evaluation of or with respect to keyphrases. For example, a metric as the number of words in a keyphrase, or, for example, a metric as the significance of a keyphrase determined by parts-of-speech thereof. Synonymously the term 'feature' may be used as often practiced in the art.

The terms cited above denote also inflections and conjugates thereof.

An illustrative exemplary environment or scenario for the disclosed subject matter is a business organization having multitude of interactions per certain periods such per a day. A member of the organization, such as a business manager, may want to concisely discern or comprehend what topics or major issues were raised or discussed in the interactions without having to refer to the overwhelming number of interactions.

A naïve overly simplified approach might be to automatically identify—exclusive of banal commonplace expressions—terms or phrases that are apparently significant or prominent in the interactions, such as repeating terms and phrases, which may be used to determine the major issues or gist of the interactions, despite the multitude of interactions that might concern other minor or less significant issues.

However, due to the idiosyncrasies and peculiarities of the channels of the interactions, phrases therein may be deformed or distorted and at least potentially or possibly deviate from the purported intents of participants in the interactions, as exemplified below.

In cases that speech-to-text conversion is applied to verbal interactions to acquire spoken phrases, the fidelity of the conversion may be degraded. For example telephonic verbal interactions in a telephone channel may be disturbed by noise or low or varying quality thus distorting clearly pronounced keyphrases, or for example face to face verbal interactions using a microphone as a channel may be disrupted by environmental noise thus cluttering or distorting keyphrases, or for example video conference interactions through a video channel may be affected by the positions of the participants and echoes thus blending pronunciations, or for example in verbal interactions via a voice channel foreign accents or odd dialects may obscure or distort the words.

In cases of textual interactions the keyphrases may be unreliable or confusing. For example, in SMS communication channel interactions may have terse sentences and textual shortcuts thus obscuring or confusing the intended meaning, or in email or IM channels interactions may occasionally include odd professional terms or jargon terms or slang terms thus rendering the phrases as unclear or indistinct.

Consequently, as exemplified above, the idiosyncrasies and peculiarities of the channels or ensuing interactions may adversely affect the keyphrases of the interactions, and as such may negatively affect the performance of the naïve approach.

Thus, one technical problem dealt by the disclosed subject matter is identifying prominent keyphrases derived from numerous interactions via diverse channels, while taking into account idiosyncrasies and peculiarities of the channels that may have adversely affected keyphrases.

Another technical problem dealt by the disclosed subject matter is identifying by the same procedure or process the prominent keyphrases derived from numerous interactions via the diverse channels, while taking into account idiosyncrasies and peculiarities of the channels.

A technical solution according to the disclosed subject matter is applying on each of the keyphrases in the numerous interactions a plurality of different operations and/or activities that derive and/or determine distinct quantitative aspects or features or metrics or measures of each of the keyphrases.

The quantitative features or metrics are combined to quantitatively evaluate the score of distinctiveness or uniqueness of the keyphrases, and one or more keyphrases having the highest ranking or scores are determined as the prominent keyphrases.

The larger number of quantitative features of the keyphrases more robust and less sensitive to variations in some features is the determination of prominent keyphrases, and having several 'orthogonal' features, that is features independent of each other, the determination of prominent keyphrases is more reliable.

In some embodiments, the quantities aspects or features are combined with suitable coefficients or weights or parameters according to the nature of the interactions, such as a weighted sum.

The weights are obtained or derived from learning and/or evaluating a sufficient large number of keyphrases in a sufficient large corpus of interactions via various channels, optionally aided by manual supervision and/or evaluation, thus modeling the characteristics of keyphrases with respect to the nature of the channels. Optionally or alternatively, the weights may be obtained by other methods, for example, optimization for a goal of quantitative distinctiveness or uniqueness of the features or metrics in various kinds of channels.

Accordingly, the same procedure may be used to quantitatively evaluate all the keyphrases in the interactions via the channels, whereas the process is tuned by the weights respective to the channels of the interactions in which the keyphrases appear.

In some embodiments, the features or metrics of the keyphrases are as follows.

(i) Statistical measure—quantifies the specificity of a keyphrase to a certain cluster or a sub-category by z-score.
The keyphrases may be clustered or grouped by technique of the art such as k-means where z-score is a standard score as known in the art (e.g. https://statistics.laerd.com/statistical-guides/standard-score.php).
(ii) Linguistic measure—quantifies the linguistic significance of a keyphrase by parts-of-speech, as, for example, adjective-noun, noun-noun, etc.
(iii) Frequency measure—quantifies the frequency of a keyphrase in the interactions relative to other keyphrases.
(iv) Lexical measure—quantifies the number of words in a keyphrase.

It is noted that others measures or metrics may be applied to the keyphrases, optionally in addition and/or in lieu of some of the metrics listed above.

Thus, accordingly, prominent keyphrases are identified or determined in multi-channel interactions by multi-feature evaluations.

A potential technical effect of the disclosed subject matter is distinguishing in numerous interactions via a plurality of channels prevalent topics in spite of adverse effects of the channels on the interactions.

A general non-limiting overview of practicing the present disclosure is presented below. The overview outlines exemplary practice of embodiments of the present disclosure, providing a constructive basis for exemplary and/or variant and/or alternative embodiments, some of which are subsequently described.

Determinations of prominent keyphrases of interactions are based on some data constructs and preparatory operations as a training for the determinations of prominent keyphrases, as outlined below with respect to operative phases.

In an initial preliminary phase, denoted also as an annotation phase, a set of representative keyphrases as training keyphrases extracted from interactions in various channels is presented to a human annotator. The annotator quantitatively annotates, or grades, the keyphrases according to a given scale based on the perceived semantic significance thereof in the context of the respective interaction. The annotated keyphrases are also denoted as gold keyphrases or a gold standard.

The grades of identical keyphrases derived from interactions of any specific channel are aggregated, such as by averaging, to yield a representative grade of identical keyphrases respective to the specific channel.

In a consecutive preliminary phase, denoted also as an adaptation phase, an array of various metrics is provided and the graded keyphrases of each channel are mapped and/or applied to a ranking model according to the metrics, thereby obtaining for each channel weights or coefficients corresponding to the metrics, denoted also as a channels template. Thus, each channel is associated or related to an array or a set of weights or coefficients.

The annotation phase and the adaptation phase together constitute a preparatory phase denoted also as a training phase.

Having completed the training phase subsequently a phase, in any time afterwards prominent keyphrases of interactions may be determined in a phase denoted also as a production phase. The metrics are applied on each keyphrase of provided interactions from various channels, yielding for each keyphrase values corresponding to the metrics.

Depending on the channel from which a keyphrase was received, the values of the keyphrase is summed with the weights or coefficients of the channel template as a weighted sum or a linear combination to yield a score of the keyphrase.

Subsequently, N keyphrases having the highest scores, or 'top-N' keyphrases, are selected as the prominent keyphrases, where N is a value equal or greater than 1. The value of N may be preset, or determined such as to minimize the variability of the top-N scores and/or the variability of the prominent keyphrases.

In view of the description above, FIG. 1 schematically illustrates an arrangement 100 of elements and phases in determination of prominent keyphrases of interactions, according to exemplary embodiments of the disclosed subject matter.

In an annotation phase, denoted as an annotation 110, keyphrases derived from a corpus of interactions from a plurality of channels, denoted also as training keyphrases 102, are provided to a human annotator, illustrated as annotator 112, who grades training keyphrases 102 according to perceived semantic significance thereof, yielding keyphrases with associated grades, denoted as gold keyphrases 104. In deriving training keyphrases 102, the relation to the respective channels of the interactions is maintained such as by tracking or association of the keyphrases with the channels.

An array of metrics, denoted as metrics 114, and a ranking construct, denoted as a ranking model 116, are provided along with gold keyphrases 104 to an adaptation phase denoted as an adaptation 120.

In adaptation 120 metrics 114 are applied on gold keyphrases 104 and quantitative evaluations of gold keyphrases 104 are provided as a training set or data to ranking model 116, resulting with an array of coefficients or weights corresponding to metrics 114 with respect to each channel, denoted as channels template 118.

The ranking construct or ranking model may be of any suitable construct or technique of the art, for example a Rank-SVM.

Having accomplished annotation 110 and adaptation 120 the training for determinations of prominent keyphrases is complete, as schematically illustrated by a bracket 196.

Subsequently, based on the training, in a production phase, denoted as a production 130, keyphrases in various interactions from various channels are obtained, denoted as test keyphrases 106. The relation of test keyphrases 106 to the respective channels of the interactions is maintained such as by tracking or association of the keyphrases with the channels.

Metrics 114 are applied to each keyphrase of test keyphrases 106, resulting with a number of values corresponding to metrics 114. Each of the values is multiplied by the coefficients from channels template 118 corresponding to metrics 114 with respect to the channel with which the keyphrase is associated, and the products are summed up yielding for each keyphrase of test keyphrases 106 a quantitative score.

Consequently, one or more of test keyphrases 106 having the highest scores and/or sufficiently high scores are determined as one or more prominent keyphrases, denoted also a prominent keyphrases 108.

Generally in arrangement 100, open-ended arrows, such as an arrow 192, imply or denote provided elements, and block-ended arrows, such as an arrow 194, imply or denote resultant entities from a phase.

FIG. 2 outlines operations 200 that illustrate some elaborations of annotation 110, according to exemplary embodiments of the disclosed subject matter.

In operation 202 sample interactions from each channel are collected as representative and/or training interactions, such as from pre-recorded interactions.

The channels comprise expected channels to be operative in organizations or businesses pertaining to the disclosed subject matter, such as telephonic and/or face to face speech interactions, SMS, emails, video conferences or any other pertinent channels such as IM (instant messaging).

For example in a feedback SMS channel, an interaction comprises a text message with a feedback on the service given to a user, for instance, "she was very helpful" or "your company is too expensive".

In operation 204, keyphrases from the representative and/or training interactions are extracted as training keyphrases. The keyphrases are identified and extracted by using, for example, a grammatical and/or a linguistic analysis to extract a set of significant keyphrases from each interaction.

For example, in the interaction "she was very helpful" the extracted keyphrases would be 'she', 'very helpful' and 'helpful'.

In operation 206, the interactions and the extracted keyphrases are presented to a human as an annotator or an evaluator, who quantitatively annotates or grades the keyphrases according to semantic importance or significance relative to respective interactions.

The keyphrases are graded according to a given scale, for example, a scale between 0 and 3 from the least important or unimportant grade to the most important one.

Table-1 below illustrates possible grading of keyphrases in the interaction "she was very helpful" according to 0-3 scale.

TABLE 1

| Keyphrase | Importance 0-3 |
| --- | --- |
| she | 0 |
| Very helpful | 3 |
| Helpful | 2 |

In operation 208 the graded semantic importance of keyphrases in the interactions are aggregated or combined such as by averaging.

Table-2 below exemplifies the grading of a keyphrase 'helpful' that appears 3 times in a set of 3 interactions of a channel.

TABLE 2

| Keyphrase | Interaction | Importance 0-3 |
|---|---|---|
| she | she was very helpful | 0 |
| very helpful | helpful service | 3 |
| helpful | everyone was helpful | 2 |

Following the example of Table-2, the grading is aggregated by averaging as the sum the importance grades of the keyphrase in each interaction divided by the number of occurrences of the keyphrase. Accordingly, the representative grade of the keyphrases would be (2+2+3)/3=2.333.

In operation 210, optionally at least as indicated by the dashed box and arrow, the aggregated importance grades are validated by the annotator who, optionally, may modify the grading of at least some of the keyphrases in view of the aggregated importance grades.

For example, the keyphrases are sorted according to the representative grade thereof and keyphrases of sufficiently high representative grade are reviewed to validate the grades and optionally modify the rank of some of the keyphrases.

FIG. 3 outlines operations 300 that illustrate some elaborations of adaptation 120, according to exemplary embodiments of the disclosed subject matter.

In operation 302 metrics of annotated keyphrases of interactions from respective channels are evaluated. Thus, when evaluating a keyphrase the channel of the interaction of the keyphrase is taken into account, such as based on the tracking or association described above for training keyphrases 102.

In some embodiments, the metrics comprise the statistical measure, the linguistic measure, the frequency measure and the lexical measure described above. Optionally or alternatively, the metrics may include other measures that favorably, if possible, are independent of each other to reveal and evaluate separate quantitative aspects of prominence of keyphrases. Accordingly, the metrics of a keyphrase may be portrayed as a uniquely defined multi-dimensional vector.

In operation 304 annotations and metrics of keyphrases are mapped therebetween by matching between the representative grade of a keyphrase and metric of the keyphrase.

Following the example of Table-2 above, the representative grade of a keyphrase is 2.333. This value is mapped or associated with values of metrics of the keyphrase as hypothetically exemplified in Table-3 below, where the values of the metrics are scaled to a range between 0 and 100.

TABLE 3

| Representative grade | 2.333 |
|---|---|
| Statistical measure evaluation | 60 |
| Linguistic measure evaluation | 66 |
| Frequency measure evaluation | 22.2 |
| Lexical measure evaluation | 33 |

In operation 306 a ranking model is trained and/or learned based on the mapped keyphrases.

In some embodiments a Rank-SVM model is applied as or like known in the art, such as in http://en.wikipedia.org/wiki/Ranking_SVM or http://olivier.chapelle.cc/pub/ordinal.pdf, where some general intuition is given in http://www.quora.com/Support-Vector-Machines/What-is-the-intuition-for-SVM-Rank-and-when-should-I-use-it.

Alternatively, other ranking models or procedures may be used, for example, linear rank regression as in http://www.math.wustl.edu/~sawyer/handouts/RankRegress.pdf.

In operation 308 weights respective to the metrics for each channel are acquired as an outcome or a consequence of applying the ranking model.

For example, assuming that the metrics are tagged or labeled as i=1 . . . M where M is the number of the different defined metrics, and the channels are indicated or marked as k=1 . . . C where C is the number of the channels, then the weights are given or represented as $w^k{}_i$. Thus, the weights $w^k{}_i$ represents a channel specific weights as the importance or significance of a metric i in channel k.

In some embodiments, the weights are biased with an offset and/or scaled to correspond to a certain or a suitable range.

Table-4 below illustrates the weights $w^k{}_i$ where k stands for a feedback SMS channel.

TABLE 4

| i | Metric | Weight |
|---|---|---|
| 1 | Statistical measure | 0.3 |
| 2 | Linguistic measure | 0.2 |
| 3 | Frequency measure | 0.2 |
| 4 | Lexical measure | 0.3 |

Generally, possibly excluding offsets, $w^k{}_i$ are relative values in the sense that the sum thereof equals 1 or an equivalent value such a 100%.

FIG. 4 outlines operations 400 that illustrate some elaborations of production 130, according to exemplary embodiments of the disclosed subject matter.

Operations 400 relate to a given plurality and/or numerous interactions via various channels, such as conducted in a business or an organization through a certain period. Generally and/or in some embodiments, the interactions are pre-processed to textually extract the keyphrases therein with an indication of the respective channel type such as by an identification code (ID) for example as a number k=1 . . . C.

In operation 402 the metrics of keyphrases of conducted interactions are evaluated, similarly as in operation 302 of operations 300 above.

In operation 404 scores of the keyphrases are calculated based on the metrics evaluations as in operation 402 and the acquired weights as in operation 308 of operations 300 above.

Thus, for keyphrases related to a specific channel the weights of the channel are used or applied in the calculation.

In some embodiments, the calculation is a weighted sum of the metrics evaluations or, equivalently, a linear combination of the metrics evaluations with the weights as coefficients, where each weight or coefficient is applied to the respective metric evaluation, as generally expressed in Formula (1) below.

$$\text{Score of a keyphrase} = \sum_{i=1}^{M} w_i^k \cdot E_i \qquad (1)$$

Where: i stands for the numeration of the metrics enumeration as, for example, in Table-4 above so that M is 4, $w^k{}_i$ stands for weight or coefficient for channel k respective to the enumeration of the metrics.

When a particular keyphrases of that belong a certain channel, that is, the keyphrases were extracted from interactions in that channel, the calculation can be expressed as in Formula (2) below.

$$\text{Score of a keyphrase in a certain channel} = \sum_{i=1}^{M} w_i \cdot E_i \quad (2)$$

As a numeric example of keyphrase score calculation, the values of metrics evaluations are exemplified in Table-5 below and the weights of Table-4 are assumed for a feedback SMS channel.

TABLE 5

| i | Metric | Evaluation |
|---|---|---|
| 1 | Statistical measure | 58 |
| 2 | Linguistic measure | 49.5 |
| 3 | Frequency measure | 19.8 |
| 4 | Lexical measure | 26 |

Accordingly, the score of a certain keyphrase is obtained according to Formula (2) by the expression below.

0.3*58+0.2*49.5+0.2*19.8+0.3*26=39.06

As noted above, in some embodiments the weights are biased with an offset and/or scaled to correspond to a certain or a suitable range.

In operation 406 the keyphrases are ranked according to the scores thereof.

One or more of the keyphrases of highest scores are selected or designated as the prominent keyphrases of the conducted interactions referred to above.

In some embodiments, determination of the prominent keyphrases is elaborated or refined. For example only keyphrases with a score above a certain threshold are selected or designated as the prominent keyphrases, or, for example keyphrases with scores that are higher by a difference greater than a certain threshold relative to the other score are selected or designated as the prominent keyphrases, or for example, only keyphrases with scores within a certain variance such one standard deviation are selected or designated as the prominent keyphrases.

FIG. 5 schematically illustrates an arrangement 500 of exemplary devices and apparatus for interactions channels, according to exemplary embodiments of the disclosed subject matter.

Without limiting, the devices are non-exhaustively represented illustratively and figuratively by a smartphone denoted as a smartphone 502, a telephone denoted as a telephone 504, a portable computer denoted as a computer 506, and a microphone denoted as a microphone 508.

Smartphone 502, based on components therein, is capable of SMS interactions via a cellular communications as an SMS channel.

Telephone 504, based on components therein, is capable of vocal interaction via PSTN (Public Switched Telephone Network) or VoIP as a speech channel.

Computer 506, based on components therein, is capable of email and IM interactions via the Internet as a text channel.

Microphone 508, based on components therein, is capable of sensing and/or capturing voices as a face to face speech channel.

Via links represented by an arrow 512, an arrow 514, an arrow 516 and arrow 518, smartphone 502, telephone 504, computer 506 and microphone 508, are respectively linked through a linkage represented by a line 522 and an arrow 524 to an interface apparatus denoted as an interface 510.

Interface 510 collects and/or records and/or optionally processes data of the interactions from the devices and forwards the data, via a link represented as and arrow 528, to a processing platform denoted as platform 520. Platform 520 is configured, such as by hardware and/or software and/or firmware, to perform the annotation phase, the adaptation phase and the production phase describe above, respectively, such as annotation 110, adaptation 120 and production 130.

In some embodiments, platform 520 is configured to extract keyphrases from textual interactions and/or transcripts of vocal interactions. In some embodiments, platform 520 and/or interface 510 are configured for transcribing vocal data of interactions to textual forms.

Platform 520 may comprise a plurality of processing platforms, possibly connected and/or separated. In some embodiments, the training phase and/or parts thereof may be carried out on one or more processing platforms at a certain place, and the production phase may be carried out on one or more other processing platforms that that may be geographically remote from the processing platform or platforms of the training phase and/or from each other. Thus, in some embodiments, based on the training, the determinations of prominent keyphrases may be carried out on different interactions that occur in different locations and/or at different times by different processing platforms that are differently located.

In some embodiments, interface 510 may comprise a plurality of units where, optionally at least, one or more of the units is separately linked to one or more of the devices.

In some embodiments, interface 510 may be combined in and/or with platform 520. For example, interface 510 may be integrated in platform 520 or interface 510 may be coupled to platform 520 such as an accessory.

Interface 510 may be akin or operative similarly to a CTI (Computer Telephony Integration) as known in the art, possibly with some modifications and/or extensions to interface with various interactions and channels.

It is emphasized that line 522 is illustrated for convenience and clarity and any of the devices such as smartphone 502, telephone 504, computer 506 and microphone 508 may separately and/or in combination link to interface 510. Extensions of line 522, illustrated as two instances of a dashed line 592, represent possible other devices and respective links thereof.

It is noted that the training for determination of prominent keyphrases may depend on the language of the interactions. Therefore, according to the intended language different sets of training keyphrases, or different gold standards, may be obtained and used for different language and/or dialects.

Considering training by keyphrases of a certain language, the determinations of prominent keyphrases do not depend on the gold standard or the context or domain thereof. Rather, the determinations of prominent keyphrases are based only on metrics of the keyphrases that may be disparate from the training keyphrases and the weight respective to the channels from which the keyphrases were obtained.

In some embodiments, an alternative technique of training for determination of prominent keyphrases may be employed, for example by using techniques of the art as can be found, for instance, in http://research.microsoft.com/pubs/68961/dlm_final_hisami.pdf or http://www.safaribooksonline.com/library/view/natural-language-annotation/9781449332693/ch01.html#container.

It is further noted that apart from the human annotation as in annotation 100, the rest of the operations such as adaptation 120 and production 130 are and/or may be carried out automatically without human involvement or participation.

It is emphasized that keyphrases of interactions, such as test keyphrases 106 and/or training keyphrases 102, are extracted from the interactions. In some embodiments, the extraction may be carried out in a preliminary preprocessing phase. Optionally or alternatively, the extraction may be carried out 'on the fly', possibly with some delay, as the interaction is acquired, for example in interface 510. Extraction of keyphrases from interactions may based on textual analysis such as a grammatical and/or a linguistic analysis. In case the interactions are non-textual, such as vocal interactions, conversion to text, such as by a speech-to-text techniques, precedes the textual analysis.

There is thus provided according to the present disclosure a method for determining prominent keyphrases in interactions, comprising, receiving keyphrases of numerous interactions received via a plurality of channels that comprise apparatuses for conveying the interactions according to the media thereof, quantitatively evaluating each keyphrase by a plurality of different metrics thereby yielding a corresponding plurality of values representing different aspects of prominence, and linearly combining the plurality of the values with a corresponding plurality of coefficients associated with a channel via which an interaction having said keyphrase was received, thereby providing a score of said keyphrase, and based on a condition related to the scores of the keyphrases, selecting at least one keyphrase as an at least one prominent keyphrase, wherein the method is at least partially performed by an at least one computerized apparatus configured for interfacing with the apparatuses of the plurality of the channels.

In some embodiments, the corresponding plurality of the coefficients is associated with a channel based on quantitatively grading keyphrases of a provided training corpus comprising of numerous interactions received via a plurality of channels that comprise apparatuses for conveying the interactions according to the media thereof.

In some embodiments, the grading is based on semantic significance of a keyphrase in the context of the interaction in which the keyphrase appears.

In some embodiments, the corresponding plurality of coefficients is obtained by applying a ranking model on the graded keyphrases and the plurality of different metrics.

In some embodiments, the ranking model is a Rank-SVM.

In some embodiments, according to the condition at least one keyphrase having the highest score is selected as an at least one prominent keyphrase.

In some embodiments, according to the condition a plurality of keyphrases having scores higher than the scores of the rest of the keyphrases are selected as the prominent keyphrases.

In some embodiments, according to the condition keyphrases having a score higher than given threshold are selected as the prominent keyphrases.

In some embodiments, according to the condition keyphrases with scores that are higher by a difference greater than a certain threshold relative to the other scores are selected as the prominent keyphrases.

In some embodiments, according to the condition keyphrases with scores within a certain variance are selected as the prominent keyphrases.

In some embodiments, configured for interfacing with the apparatuses of the plurality of the channels implies configured for indirectly interfacing with the apparatuses of the plurality of the channels via an interfacing device.

In some embodiments, configured for interfacing with the apparatuses of the plurality of the channels implies configured for directly interfacing with the apparatuses of the plurality of the channels.

In some embodiments, keyphrases of interactions are obtained in advance based on textual analysis of the contents of the interactions.

There is thus further provided according to the present disclosure an apparatus for carrying out the method.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or gro As used herein, ellipsis ( . . . ) between two entities or values denotes an inclusive range of entities or values, respectively. For example, A . . . Z implies all the letters from A to Z, inclusively.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for determining prominent keyphrases in interactions, comprising:
  receiving keyphrases of numerous interactions received via a plurality of channels that comprise apparatuses for conveying the interactions according to the media thereof;
  depending on each channel from said plurality of channels from which each keyphrase was received, quantitatively evaluating each keyphrase by a plurality of different metrics thereby yielding a corresponding plurality of values representing different aspects of prominence, and linearly combining the plurality of values with a corresponding plurality of coefficients associated with each channel from said plurality of channels via which an interaction having each keyphrase was received, thereby providing a score for each keyphrase; and
  based on a condition related to the scores of the keyphrases, selecting at least one keyphrase as an at least one prominent keyphrase,
  wherein the method is at least partially performed by an at least one computerized apparatus configured for interfacing with the apparatuses of the plurality of the channels.

2. The method according to claim 1, wherein the corresponding plurality of coefficients is based on quantitatively grading keyphrases of a corpus of numerous interactions received via said plurality of channels.

3. The method according to claim 2, wherein the grading is based on a semantic significance of the keyphrases.

4. The method according to claim 2, wherein the corresponding plurality of the coefficients is obtained by applying a ranking model on the graded keyphrases and the plurality of different metrics.

5. The method according to claim 4, wherein the ranking model is a Rank-SVM.

6. The method according to claim 1, wherein the condition for selecting the at least one keyphrase comprises at least one keyphrase having a highest score.

7. The method according to claim 1, wherein the condition for selecting the at least one keyphrase comprises a plurality of keyphrases having scores higher than the scores of the rest of the keyphrases.

8. The method according to claim 1, wherein the condition for selecting the at least one keyphrase comprises keyphrases having a score higher than a given threshold.

9. The method according to claim 1, wherein the condition for selecting the at least one keyphrase comprises keyphrases having scores that are higher by a difference greater than a certain threshold relative to the other scores.

10. The method according to claim 1, wherein the condition for selecting the at least one keyphrase comprises keyphrases having scores within a certain variance.

11. The method according to claim 1, wherein configured for interfacing with the apparatuses of the plurality of the channels implies configured for indirectly interfacing with the apparatuses of the plurality of the channels via an interfacing device.

12. The method according to claim 1, wherein configured for interfacing with the apparatuses of the plurality of the channels implies configured for directly interfacing with the apparatuses of the plurality of the channels.

13. The method according to claim 1, wherein keyphrases of interactions are obtained in advance based on textual analysis of the contents of the interactions.

14. An apparatus for carrying out the method according to claim 1.

15. The method according to claim 1, further comprising:
  annotating the keyphrases received from said plurality of channels;
  mapping the annotated keyphrases with said plurality of different metrics;
  training a ranking model based on the mapped keyphrases; and
  acquiring weights for each channel in said plurality of channels by applying the ranking model.

* * * * *